United States Patent

[11] 3,622,428

| [72] | Inventor | James E. Robinson<br>Neenah, Wis. |
|---|---|---|
| [21] | Appl. No. | 729,585 |
| [22] | Filed | May 16, 1968 |
| [45] | Patented | Nov. 23, 1971 |
| [73] | Assignee | Kimberly-Clark Corporation<br>Neenah, Wis. |

[54] STAPLE FIBER REINFORCED THERMOPLASTIC FILM
13 Claims, 5 Drawing Figs.

[52] U.S. Cl. ................................................ 161/59,
156/246, 161/109, 161/141, 161/143, 161/170
[51] Int. Cl. ........................................... B32b 5/08,
B32b 5/12
[50] Field of Search .......................................... 156/62.4,
178, 298, 246, 176, 247, 177, 279, 280; 161/57,
59, 143, 170, 144, 141

[56] References Cited
UNITED STATES PATENTS

| 1,885,280 | 11/1932 | Moore ........................... | 161/59 |
| 2,407,548 | 9/1946 | Goldman ...................... | 161/57 |
| 2,777,788 | 1/1957 | Bragg, Jr. ..................... | 161/59 |
| 2,897,841 | 8/1959 | In Wai Hui et al. ............ | 156/178 |

OTHER REFERENCES

J. Gordon Cook, Handbook of Textile Fibers, Vol. I., Merrow Publishing Co. (1968), p. 49.

*Primary Examiner*—Robert F. Burnett
*Assistant Examiner*—Raymond O. Linker, Jr.
*Attorneys*—Paul J. Glaister, Keith T. Bleuer, Daniel J. Hanlon, Jr. and Raymond J. Miller ABSTRACT: A film-staple fiber combination in which material of the film serves as a binder for the staple fibers of the web imparting strength to the web so that the web serves to reinforce the film. A method of combining the film and staple fiber web, neither of which by itself has significant strength, into a unitary product of high tensile, low caliber, great flexibility and toughness with a high degree of tear resistance and similar desirable physical characteristics for industrial use is provided. The product may be calendered for smoothness, embossed to desired textures or to provide breathability, pigmented for opacity, appearance and printing purposes, and is useful in conjunction with mechanical fasteners as in tarpaulins, tents, industrial covers and garment fabrics in the nature of rainwear, protective clothing and the like.

STAPLE FIBER REINFORCED THERMOPLASTIC FILM

BACKGROUND OF THE INVENTION

1. Field of the Invention

This invention relates generally to thermoplastic resin films which both unite individual fibers into a web of significant strength and are in turn reinforced by the strengthened web; the invention is also directed to a method of forming such strengthened films.

2. The Invention with Relation to the Prior Art

Strong, flexible, thin, relatively lightweight, inexpensive material is desirable for many applications such as tents, tarpaulins, rainwear, automobile upholstery and the like. Prior attempts to produce a cloth substitute for such end uses have involved the binding of layers of staple fibers into sheet form, or the production of air laid, resin impregnated mats and the like. One or more difficulties have been inherent to proposed structures; those involving basically the staple fibers have frequently resulted in poor strength to weight ratios, in poor strength in one direction of fiber lay or where the strength has been suitably isotropic, the sheets have been of excessive and nonuniform thickness; further, adequate strength has often been accompanied by excessive stiffness. Additionally, the prior procedures employed are not readily adaptable to the handling of very lightweight webs and economy of production is not, therefore, satisfactory.

I have found that, by employing a distinct excess of a thermoplastic material relative to a highly drawn web of synthetic fibers, a very useful product for industrial purposes, for example, may be obtained even though a film of the thermoplast or the fiber web itself has no significant strength. A drawn web as known in the art consists of fibers (usually 1 inch or more long) and of small denier (about 0.5 to 15) formed into a longitudinal alignment by passage through a draw frame and having, until bonded, very little longitudinal or lateral strength. The fibers are overlapped lengthwise and retained together by mutual adhesion along their length being relatively slippable under tension. A thin ribbon of such drawn web, in the practice of this invention, is presented to a wet, relatively thick, displaceable plastic film in such manner that the fibers of the web are first floated in and then by mechanical action caused to penetrate into the film, displacing the thermoplastic material to cause it to enter around and between fibers as well as to cover the fibers but without significant settling of the fibers to the underside of the film. Thus, the fibers become wholly embedded within the film and the product will have surfaces provided by the thermoplast; significantly and inherent to the procedure is that tension on the drawn web is low and very nearly zero during the application to the thermoplastic film while the film itself is thick relative to the fiber web thickness, both factors inhibiting against complete film penetration by the web, thereby providing the desired film over the fibers on the opposed surfaces of the reinforced film product.

Importantly, the thermoplastic film wets the fibers of the web tending to aid in fiber adherence as the composite is presented to subsequent sequential pressing and film hardening or solidifying operations, thus minimizing fiber spreading and separation during these procedures. In the final set product the web tensile strength of the composite approaches that of the individual fibers; to attain product strength in crossdirections the reinforced films are cross-laid.

I have particularly found that an assembly of two-ply cross-laid reinforced films suitable for many quality demanding industrial applications may be produced in relatively light weights of between about 30 to 300 grams per square yard, and that such are capable of replacing impregnated woven fabrics in such uses as tarpaulins, tent fabrics and the like. For these general purposes I prefer to employ drawn webs which, in single ply form, are of between about 5 grams per square yard to about 50 grams per square yard; the associated thermoplastic film weights, while varying somewhat with the specific material, is then about 1½ to 3 times the fiber weight for most product purposes. Thickness of the assembly (unembossed but two-ply cross-laid) may be as low as about 1 mil to about 10 mils, that is, up to about twice conventional paper thickness, while being of much greater strength than cellulosic papers of equivalent thickness.

For my preferred purposes in the production of products for hard commercial usage such as tarpaulins, the web is of highly drawn or drafted staple fibers of very low denier (0.5 to 3), the fibers having a length of 2½ to about 3 inches; such fibers may be the synthetic materials including viscose or acetate rayon, nylon, the polyesters, acrylonitriles and the like; such fibers must have a higher softening point than the fusion temperature of the film-forming material employed so that the fibers retain their integrity in processing. The film-forming material, which serves both as a fiber-bonding agent and fiber encasement, may include the plasticized vinyl chloride polymers and copolymers of vinyl chloride with other vinyl resin materials plasticized by organic agents such as dioctyl phthalate, thricresyl phosphate, dibutyl sebacate and the like.

The film which encases the fiber webs may be translucent or semitransparent, thus permitting the passage of light, or may be suitably pigmented to provide for film opacity, printability and color; also, the film may be embossed without significant fiber disturbance to provide surfaces attractive to the eye and hand. In general, the product of the procedure of invention is readily formed and has desirable attributes of impregnated woven materials while the costly steps involved in weaving, treating or coating processes are avoided.

Very suitably, I employ an endless belt as a temporary support on which the composite is formed and from which it is stripped in a substantially continuous operation; in many instances a drum cylinder may be substituted for the belt to provide the endless surface useful in composite formation.

A very useful characteristic of the product is its toughness, that is, the ability to withstand stresses due to tension, impact, burst, tear and the like without significant strength or flex loss or change in dimension. Equally important is that a significant vinyl surface is presented, and such functions to provide the product with considerable abrasion resistance. Such properties also contribute to the capability of the product for embossment, an action which may increase product thickness in a localized area by as much as about 100 percent.

The invention will be more fully understood by reference to the following detailed description and the accompanying drawings wherein.

Figure 1:
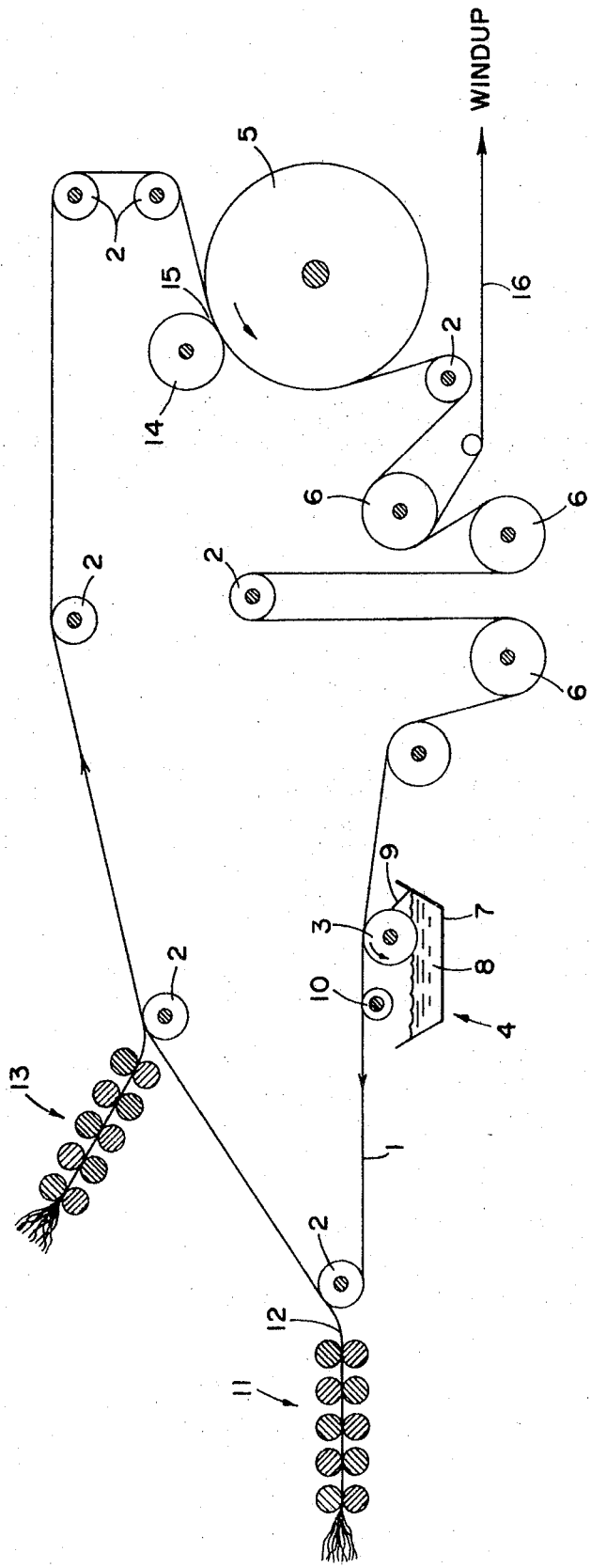
FIG. 1 illustrates in an elevational and side view one form of production apparatus suitable for the practice of the invention.

In the drawing (FIG. 1) the numeral 1 designates an endless belt of woven fiber glass with a continuous smooth release surface provided by a tetrafluorethylene coating. This belt is trained over rollers designated by the numeral 2 for movement in the direction indicated by the arrows and is driven by any suitable mechanism (not shown) at a speed of approximately 100 f.p.m. The belt 1 in its transverse over the rollers 2 engages an applicator roll 3 at a station generally indicated by the numeral 4 and is also trained about a relatively large remotely positioned heating roll 5 and a plurality of cooling rolls 6. The applicator station 4 includes the applicator roll 3, pan 7 containing a bonding agent dispersion 8, and a wiper blade 9, the direction of the rotation of the roll 3 being indicated by the arrow. Immediately adjacent applicator station 4 and in the direction of belt travel is a metering doctor rod 10 which functions to smooth on to the belt 1 the film of material conveyed to the belt by the applicator roll 3. Most suitably, the rod 10 is a Meyer rod rotating in the same direction as the belt travel and functioning to limit the thickness of the film deposited on the belt as well as to smooth the film. Additionally, the Meyer rod is positioned to return to the pan 7 the excess of material applied by the applicator roll 3 in its action.

In the general operation of the mechanism as illustrated in FIG. 1, a relatively heavy film of bonding agent dispersion is applied to the belt 1 which, in the course of its travel, is directed to a draw frame generally indicated at 11 and from which a thin web of fibers 12 is fed to the bonding agent carried by the belt 1. An additional draw frame 13 may be used to increase the weight of fibers or to serve as a standby fiber source should troubles occur at draw frame 11. Further, the equipment arrangement includes squeeze roll 14 forming the nip 15 with the internally heated roll 5.

In general operation, the web which is of little strength and light weight is floated in the wet bonding agent film applied by roll 3 and is carried as a composite to nip 15 and squeezed and pressed while being heated. The composite is confined and squeezed between the belt 1 and roll 5 to effect the pressing and, when cured, is carried from roll 5 by the belt. Cooling of the composite substantially immediately as the composite leaves the roll 5. The belt itself retains some heat and it is desirable in most instances to cool the same prior to returning the belt to the coating applicator station 4. For this purpose the cooled rolls 6 are provided intermediate roll 5 and station 4.

In a preferred practice of the invention the bonding agent in pan 7 is suitably a plastisol of the following formulation:

| | Parts by Weight |
|---|---|
| Polyvinyl chloride (Geon 135, a B.F. Goodrich product) | 100 |
| Dioctyl phthalate | 70 |
| Ferro 6V6A heat and light organic stabilizer (Ba, Cd, Zn) a product of Ferro Chemical Co., Bedford, Ohio | 3 |
| $TiO_2$ | 3 |
| Coloring pigment, Claremont high chrome yellow No. K928 (made by Claremont Polychemical Corp., Roslyn Heights, New Jersey) | 21 |
| No. 10 mineral spirits | 10 |

The viscosity of this dispersion as applied to the belt is about 3,500 centipoises Brookfield as measured with a No. 4 spindle at 20 r.p.m.

In the provision of the above formulation a portion of the dioctyl phthalate was added to the polyvinyl chloride resin together with the stabilizer; the $TiO_2$ was then added after being dispersed in the remaining phthalate plasticizer. The chrome yellow pigment is commercially available dispersed in dioctyl phthalate and such is added to the components while agitating to provide both pigment and the noted plasticizer quantity. The mineral spirits are added intermittently while agitating in order to attain the ultimately desired viscosity. The above formulation is allowed to age for a period of 24–48 hours to allow full dispersion of the resin particles in the plasticizer. During this period the resin particles swell with the absorption of the dioctyl phthalate. The viscosity at this point is high and not readily adapted to application by conventional applicator means, Mineral spirits are employed as indicated in the formula to reduce the viscosity. The agitation is continued until a complete dispersion of the components is achieved. Usual practices in the handling of plastisols and organosols are followed. The sol, that is, the bonding agent dispersion, is supplied to pan 7 and maintained at a temperature of about 70° F.–100 F. Some variation in temperature is permissible but the applicator roll, the pan and the traveling belt should be maintained at about the same temperature as the sol to avoid premature gelation.

The circumferential surface speed is about 100 r.p.m. and is maintained at the same speed as that of the belt 1. A considerable excess of the bonding agent is carried by the applicator roll 3 to the belt and spreads across the surface of the belt readily to form a continuous wet layer of about 5 mils thickness. This layer of wet-bonding agent dispersion is carried to the metering roll and reduced in thickness to about 1 mil; a continuous film thus covers the belt as the dispersion is carried toward the draw frame 11.

The rheology of the dispersion at this time is such that the thin film as formed by the Meyer rod is level in nature and without ridges or the like. Despite the fact that the film is "wet," it does not flow significantly even when subjected unsupported to the pull of gravity (FIG. 1).

The Meyer rod 10 is capable of providing different film weights and thicknesses of bonding agent dispersion to the traveling belt 1 from a given mode of operation of the applicator roll 3. In this specific example a No. 18 Meyer rod was employed and this resulted in a film weight, utilizing the plastisol set out above, of 35 grams per square yard. On this basis the wet film on the belt exhibited an apparent thickness of approximately 1 mil.

The draw frame 11 delivers to the traveling belt 1 a thin loose web of fibers. The fibers in this instance were constituted of a polyester produced by the polymerization of ethylene glycol and terephthalic acid. This web is obtained from synthetic fibers of about 2½–3 inches length and about 2.25 denier; the fibers are, as manufactured and sold, provided in bales and a succession of mechanical operations are involved in providing the drafted web. These include opening the fibers by tumbling them in contact with each other to decrease the mass density; this is followed by carding to complete the opening operation and to orient the fibers in a general direction. The oriented fibers are coiled into slivers and a plurality of the slivers are then subjected to a drawing or sequence of drawings to attain a 90–95 percent fiber orientation in one direction; ribbons of such drawn, oriented fibers are then again drawn, as on the draw frame at 11, to provide a web which is reduced in weight on an area basis by about 15 times under that of the incoming sliver. A six to 30 times reduction is commonly attained quite readily.

In the present instance the web was composed of polyester fibers which provide in the product a high degree of toughness, that is, an ability to absorb energy. The fibers themselves are smooth surfaced, undyed, and approximately 0.0006 inch in diameter. The light weight web constituting these fibers is fed to the traveling plastisol film and apparently because of the very light weight of the web and the small diameter of the fibers the web first floats somewhat in the plastisol film and then becomes wholly immersed in the film under the influence of mechanical action at nip 15 (FIG. 1). The pressure in the nip is moderate and the fibers are still largely not effectively bonded together. A nip pressure of about 20 pounds/lineal inch serves the purpose of impregnation for most products.

The plastisol, when first subjected to heat of roll 5, tends to drop sharply in viscosity; the viscosity will then rise when, due to further heating, fusion occurs. The plastisol at nip 15 must be fluid so that it may work its way under the influence of the relatively light pressure between the closely aligned parallel fibers of the web, coating and covering the fibers substantially completely. The pressure in the nip should not be so great as to displace the wet plastisol from the web or to cause web distortion. The pressure should be sufficient to provide for complete embedment and coverage of the fibers in the absence of air pockets or the like. In the specific example under consideration the temperature of the roll 5 was about 300° F. and at nip 15 the plastisol is fluid.

The web traveling toward the nip 15 may be in some instances directed into the nip with only insignificant contact with the periphery of roll 5 prior to entry to the nip. In other instances it may be desirable, depending upon roll temperature, the specific thermoplastic material involved and the like to provide the traveling composite with a slight arc of contact with roll 5 prior to nip 15.

In general, I have found that the arc of contact should be, prior to entering nip 15, small, even zero, that is, the web is tangent to the roll as it enters nip 15. This latter, is particularly so when a plastisol is employed as the plastic material.

Following nip 15 the composite is carried on the heated roll 5 a sufficient peripheral distance to fuse the plastisol so that the composite may be removed from the roll 5. This fusion develops the tensile strength of the plastisol itself permitting easy removal from the roll.

The thin web of fibers as supplied from the draw frame had a weight of about 25 g./sq. yd. No shrinkage of significance takes place during the impregnation procedure, and the product weight from roll 5 in the present instance is about 60 g./sq. yd., the product having somewhat more plastic film by weight than the fiber weight, that is, 35 g. vs. 25 g. per sq. yd.

The temperature of the rolls 6 is maintained at about 180° F., and there should be sufficient time and belt travel distance to cool the film composite while still on the belt to a temperature of no more than 225° F. in order to build sufficient tensile strength in the film composite to allow clean stripping during removal from the belt surface. The film leaving the roll 5 may be guided around several of the cooling rolls before stripping from the belt if desired. In any event, the film should be sufficiently cooled that it develops adequate strength for removal from the belt without composite distortion. As shown in FIG. 1, the composite is directed to windup as it leaves the apparatus arrangement.

Figure 2:
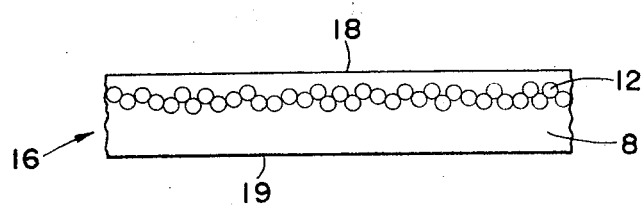
FIG. 2 is a somewhat idealized, much enlarged view illustrating the relationship of film and fiber web in a reinforced film composite in accordance with the invention.

The film composite, as above described, is illustrated at 16 in FIG. 2 in cross section, the fiber web being, as shown, somewhat idealized and designated by the numeral 12; the adhesive composition is designated by the numeral 8. AS will be noted from the figure, the web 12 is not positioned centrally of the thickness of the composite. Rather, the composite has two sides 18 19. This structure of the composite permits the formation of assemblies having various characteristics by simply bringing two of the composites together to provide the webs of adjacent composites in either closely spaced or more distantly spaced relation as is illustrated by the structures of FIGS. 3–5 inclusive.

Figure 3:
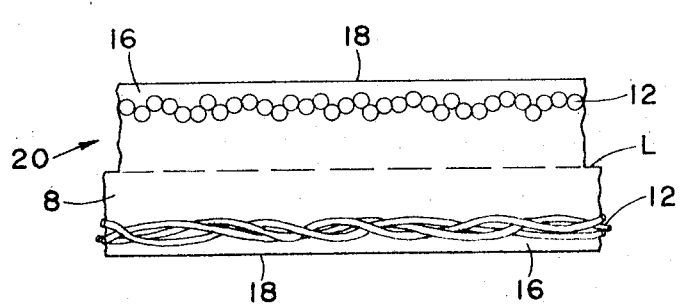
FIG. 3 is an assembly of two self-bonded films cross-laid to provide a film product of significant cross-directional strength.

Referring now specifically to FIG. 3, it will be noted that the assembly designated by the numeral 20 is formed of two cross-laid composites 16. Thus, such assembly will have strength in the longitudinal as well as lateral direction. Further, as illustrated in FIG. 3, the two composites have been assembled with the webs 12 of the composites rather far apart. More specifically, the composites have been brought together and laminated simply by the use of pressure and heat to form the assembly 20 with the main portion of the adhesive composition thickness of the composites in contact. Thus, the top and bottom surfaces of the assembly 20 in FIG. 3 have surfaces 18, that is, surfaces which are close to the web of the composite.

Figure 4:
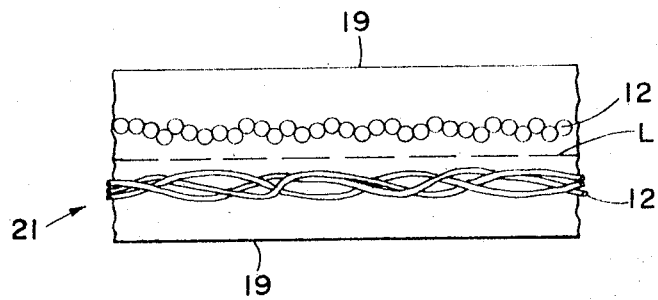
FIG. 4 illustrates another mode of arranging the reinforced films in an assembly.

Referring now to FIG. 4, the assembly 21 is so provided that the surfaces 19 (see FIG. 2) are on the top and bottom sides while the cord lines 12 are in closely spaced relation.

Figure 5:
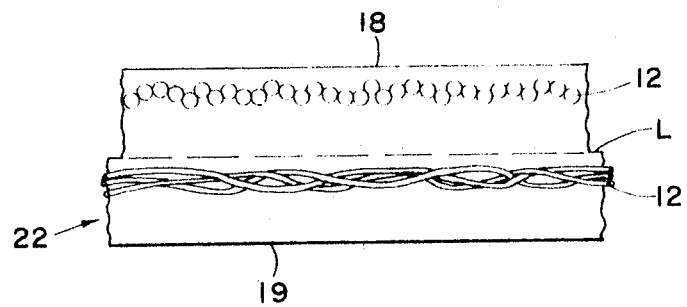
FIG. 5 illustrates a further arrangement of two cross-laid composites into an assembly.

In FIG. 5 the numeral 22 designates an assembly in which the top and bottom surfaces are the same as those at 18 and 19 in FIG. 2, the cord lines 12 being well spaced apart.

The finished product, when produced as described above and illustrated in FIGS. 3–5 inclusive, had an overall thickness of about 5 mils, the appearance of a vinyl coated fabric, and the finished weight was about 120 grams per square yard. The tensile strength as measured by an Instron tensile tester is 43 pounds per inch of test strip width and the elongation is approximately 25 percent at break. This combination of tensile and elongation results in a high-toughness material capable of absorbing substantial energy before breaking. The modulus of the film composite 16 is about the same as the original fibers. Because of the high strength to weight ratio which generally makes it superior to conventional woven products, and due to its water imperviousness and the ability to accept and retain stitching and clamps, proposed uses are as tarpaulins, awnings, truck covers, upholstery, protective clothing and the like. Also, the pound per inch tensile strength per ounce per square yard weight is as high as about 11. This feature, together with water resistance and imperviousness, mildew resistance, fire retardancy and tear resistance, make it superior to conventional coated woven fabrics. Where toughness is not a factor, rayon may be substituted suitably for the polyester fibers in the product above described.

The product described may be made air permeable or provided with fine capillaries by subjecting the cross-laid product to a micropore-embossing process; such provides for breathability in the film without materially sacrificing water imperviousness. Additionally, the fabric may be improved as to hand and feel by simply embossing on conventional embossing equipment.

Important from the esthetic and functional point of view is that the film material may be pigmented to render it opaque without any significant sacrifice in flexibility, drape or the like, the general physical characteristics being much like that of a thin cloth at much higher tensile strength. Further, the pigments may be colored (natural or dye) and products have been produced in yellow, black, green, blue and white, for example. The pigmentation of the plastisol is, of itself a conventional procedure and need not be described in detail to one skilled in the art. However, it is to be noted that, even with a large proportion by weight of the strength-imparting fiber webs in the composite and with a pigment to plastisol ratio by weight as high as 2 or 3:1 (clay, $TiO_2$ and the like) the product retains its flexibility and similar desirable physical characteristics; a composition in which $TiO_2$ and clay have been employed in equal parts by weight at a ratio of 2½ parts of pigment to 1 of binder makes a very suitable white sheet. Also, however, the film may be maintained translucent by the substantial exclusion of pigment. These pigment containing films are very readily printed.

As many apparently widely different embodiments of this invention may be made without departing from the spirit and scope thereof, it is to be understood that I do not limit myself to the specific embodiments thereof except as defined in the appended claims.

I claim:

1. A composite in the form of a reinforced film comprising a thin lightweight drawn fiber web of synthetic fibers in the form of a ribbon having of itself no significant tensile strength, a continuous body of an adhesive film-forming composition in the form of a film extending between and around the fibers of the web bonding the fibers together longitudinally to provide a bonded web with significant tensile strength, said film body also of itself having little tensile strength and said film body enveloping the web providing the film body as the outer surfaces of the composite, said film body weight between about 1½ and 3 times the fiber web weight, said bonded web reinforcing the film body so that the composite is a unitary product of high tensile strength.

2. A composite according to claim 1 in which the film body has upper and lower substantially planar surfaces and the drawn fiber web enclosed by the film body is also substantially planar and positioned more closely to one of said film body surfaces than the other of said surfaces.

3. A composite according to claim 1 in which the drawn web is formed of fibers having a denier of between about 0.5 and 15.

4. A composite according to claim 1 in which the film contains an opacifying pigment to the extent of between about 2 to 3 times the weight of the adhesive forming the film body.

5. A composite according to claim 1 in which the composite has perforations therethrough to render the composite vapor pervious.

6. A composite according to claim 1 in which the composite is embossed.

7. A composite according to claim 1 in which the film body is substantially unpigmented and translucent.

8. An assembly comprising a first composite having a web of drawn synthetic staple fibers which extend substantially wholly in one direction, said web having of itself little tensile strength, a film as a binder for the staple fibers of the web imparting strength to the web so that the web serves to reinforce the film, said film substantially completely covering the fibers with the weight of said film being between about 1½ and 3 times the weight of said fibers, and a second and similar composite of drawn synthetic staple fibers and a film, the weight of said film being between about 1½ and 3 times the weight of said fiber, said film serving as a binder for the fibers of the web of the second composite and encompassing the web, said first and second composites being superposed and bonded together by the film bodies to form an assembly at a common juncture with the drawn webs of the composites extending in cross-laid relation to each other.

9. An assembly according to claim 8 in which the webs of staple fibers define cord lines extending in substantially parallel relation in planes which are well spaced from the junction of the composites, each web being closer to an exposed surface of the assembly than to said junction.

10. An assembly according to claim 8 in which the webs of staple fibers define cord lines extending in substantially parallel relation in planes which are well spaced from the junction of the composites, at least one of said webs being closer to said junction than to an exposed surface of said assembly.

11. An assembly according to claim 8 in which the webs of staple fibers define cord lines extending in substantially parallel relation in planes which are well spaced from the junction of the composites, each of said webs being closer to said junction on opposite sides thereof than to an exposed upper or lower surface of said assembly.

12. An assembly according to claim 8 in which the webs of staple fibers define cord lines extending in substantially parallel relation in planes which are well spaced from the junction of the composites, one of said webs being more close to said junction than to an exposed surface of the assembly and the other of said webs being more close to an exposed surface than to said junction.

13. An assembly according to claim 8 in which the square yard weight is between about 30 grams and 300 grams and the thickness is between about 1 mil and 10 mils.

* * * * *